(12) United States Patent
Noguchi et al.

(10) Patent No.: US 7,919,554 B2
(45) Date of Patent: Apr. 5, 2011

(54) HEAT-RESISTANT SEAL MATERIAL, ENDLESS SEAL MEMBER USING HEAT-RESISTANT SEAL MATERIAL, AND DOWNHOLE APPARATUS INCLUDING ENDLESS SEAL MEMBER

(75) Inventors: Toru Noguchi, Ueda (JP); Hiroyuki Ueki, Ueda (JP); Akira Magario, Ueda (JP); Shigeki Inukai, Ueda (JP); Masaei Ito, Sagamihara (JP); Takashi Wanibuchi, Kitamoto (JP); Takushi Matsushita, Kounosu (JP); Tsuyoshi Watanabe, Ina-machi (JP)

(73) Assignees: Nissin Kogyo Co., Ltd., Ueda (JP); Schlumberger Technology Corporation, Sugar Land, TX (US)

( * ) Notice: Subject to any disclaimer, the term of this patent is extended or adjusted under 35 U.S.C. 154(b) by 152 days.

(21) Appl. No.: 12/327,396

(22) Filed: Dec. 3, 2008

(65) Prior Publication Data
US 2009/0253852 A1    Oct. 8, 2009

Related U.S. Application Data

(63) Continuation of application No. PCT/JP2008/057223, filed on Apr. 7, 2008.

(51) Int. Cl.
*C08K 3/04* (2006.01)
*B29C 59/00* (2006.01)

(52) U.S. Cl. ........................... 524/496; 264/122

(58) Field of Classification Search .................. 524/496
See application file for complete search history.

(56) References Cited

U.S. PATENT DOCUMENTS

| | | | |
|---|---|---|---|
| 7,410,603 B2 * | 8/2008 | Noguchi et al. | 264/122 |
| 2004/0241440 A1 | 12/2004 | Noguchi et al. | |
| 2005/0075443 A1 | 4/2005 | Noguchi et al. | |
| 2006/0062986 A1 | 3/2006 | Magario et al. | |
| 2006/0079627 A1 | 4/2006 | Noguchi et al. | |
| 2006/0214560 A1 | 9/2006 | Noguchi et al. | |
| 2007/0100058 A1 | 5/2007 | Noguchi et al. | |
| 2007/0112124 A1 | 5/2007 | Noguchi et al. | |
| 2008/0132635 A1 | 6/2008 | Noguchi et al. | |
| 2008/0167417 A1 * | 7/2008 | Noguchi et al. | 524/496 |
| 2008/0220991 A1 * | 9/2008 | Slay et al. | 507/203 |

FOREIGN PATENT DOCUMENTS

| | | |
|---|---|---|
| JP | A-6-41378 | 2/1994 |
| JP | A-9-109703 | 4/1997 |
| JP | A-9-211142 | 8/1997 |
| JP | A-2005-97525 | 4/2005 |
| JP | A-2005-248167 | 9/2005 |
| JP | A-2005-325261 | 11/2005 |
| WO | WO 2006/006468 A1 | 1/2006 |

OTHER PUBLICATIONS

Endo et al., "Extreme-Performance Rubber Nanocomposites for and Probing Excavating Deep Oil Resources Using Multi-Walled Carbon Nanotubes," Advanced Functional Materials, 2008, vol. 18, pp. 1-7.
U.S. Appl. No. 11/475,032, filed Jun. 27, 2006 in the name of Toru Noguchi et al.
U.S. Appl. No. 11/475,033, filed Jun. 27, 2006 in the name of Toru Noguchi et al.
U.S. Appl. No. 11/785,875, filed Apr. 20, 2007 in the name of Toru Noguchi et al.
U.S. Appl. No. 11/987,254, filed Nov. 28, 2007 in the name of Toru Noguchi et al.
U.S. Appl. No. 12/326,509, filed Dec. 2, 2008 in the name of Toru Noguchi et al.
U.S. Appl. No. 12/326,490, filed Dec. 2, 2008 in the name of Toru Noguchi et al.

* cited by examiner

*Primary Examiner* — Ling-Siu Choi
*Assistant Examiner* — Hui Chin
(74) *Attorney, Agent, or Firm* — Oliff & Berridge, PLC

(57) ABSTRACT

A heat-resistant seal material includes 100 parts by weight of a ternary fluoroelastomer, 1 to 30 parts by weight of vapor-grown carbon fibers having an average diameter of more than 30 nm and 200 nm or less, and carbon black having an average particle diameter of 25 to 500 nm. The heat-resistant seal material contains the vapor-grown carbon fibers and the carbon black in an amount of 20 to 40 parts by weight in total. The heat-resistant seal material has a compression set when subjected to a compression set test at a compression rate of 25% and a temperature of 200° C. for 70 hours of 0 to 15% and a dynamic modulus of elasticity at 200° C. ($E'/200°$ C.) of 30 to 100 MPa.

9 Claims, 5 Drawing Sheets

HEAT-RESISTANT SEAL MATERIAL, ENDLESS SEAL MEMBER USING HEAT-RESISTANT SEAL MATERIAL, AND DOWNHOLE APPARATUS INCLUDING ENDLESS SEAL MEMBER

CROSS REFERENCE TO RELATED APPLICATION

This application is a continuation of International Patent Application No. PCT/JP2008/057223, having an international filing date of Apr. 7, 2008, which designated the United States, the entirety of which is incorporated herein by reference.

BACKGROUND OF THE INVENTION

The present invention relates to a heat-resistant seal material having high heat resistance, an endless seal member using the heat-resistant seal material, and a downhole apparatus including the endless seal member.

In recent years, a composite material utilizing vapor-grown carbon fibers (i.e., carbon nanotubes) has attracted attention. Such a composite material is expected to exhibit improved mechanical strength and the like due to the vapor-grown carbon fibers. On the other hand, since the vapor-grown carbon fibers easily aggregate, it is very difficult to uniformly disperse the vapor-grown carbon fibers in a matrix of the composite material.

A carbon fiber composite material has been proposed which is produced by mixing carbon nanotubes with an elastomer so that the elastomer molecules are bonded to terminal radicals of the carbon nanotubes, whereby the carbon nanotubes exhibit improved dispersibility due to a decrease in aggregating force (e.g., JP-A-2005-97525).

A fluoroelastomer has been used for a seal material (e.g., O-ring) utilizing its excellent heat resistance (e.g., JP-A-6-41378).

A heat-resistant seal material has been applied to a downhole apparatus for probing underground resources (e.g., petroleum and natural gas), for example (e.g., JP-A-9-211142). The downhole apparatus includes various measurement tools, and is disposed in a borehole formed in the ground to be able to move upward and downward. The downhole apparatus utilizes a seal material which exhibits excellent chemical resistance, heat resistance, and pressure resistance for a joint between steel pipes or a joint between pressure vessels. In recent years, it has been necessary to form deeper holes in order to probe underground resources. Therefore, a seal material which exhibits higher heat resistance has been desired for the downhole apparatus.

SUMMARY

According to a first aspect of the invention, there is provided a heat-resistant seal material comprising:

100 parts by weight of a ternary fluoroelastomer;

1 to 30 parts by weight of vapor-grown carbon fibers having an average diameter of more than 30 nm and 200 nm or less; and carbon black having an average particle diameter of 25 to 500 nm, the heat-resistant seal material containing the vapor-grown carbon fibers and the carbon black in an amount of 20 to 40 parts by weight in total, and having a compression set when subjected to a compression set test at a compression rate of 25% and a temperature of 200° C. for 70 hours of 0 to 15% and a dynamic modulus of elasticity at 200° C. (E'/200° C.) of 30 to 100 MPa.

According to a second aspect of the invention, there is provided an endless seal member formed by using the above-described heat-resistant seal material and having an external shape without ends.

According to a third aspect of the invention, there is provided a downhole apparatus comprising the above-described endless seal member.

DETAILED DESCRIPTION OF THE EMBODIMENT

Figure 1:
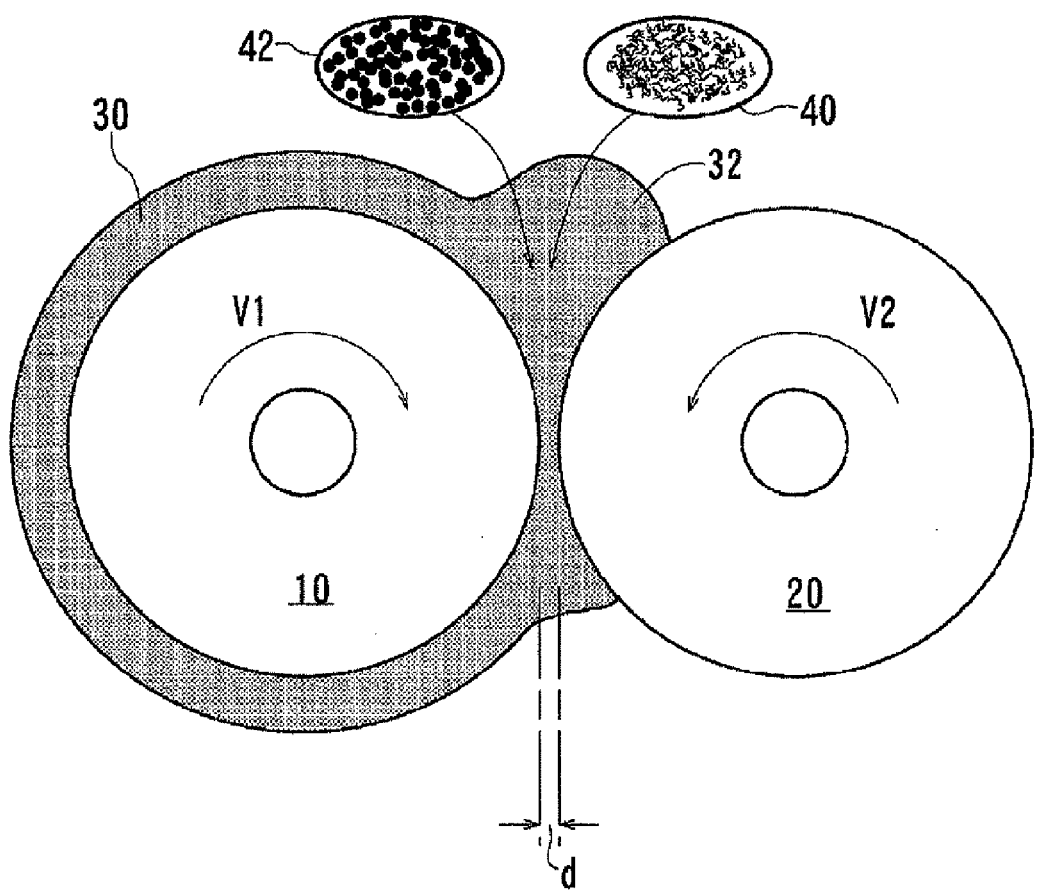
FIG. 1 is a diagram schematically showing a method of mixing a fluoroelastomer and vapor-grown carbon fibers utilizing an open-roll method employed in one embodiment of the invention.

The invention may provide a heat-resistant seal material in which vapor-grown carbon fibers are uniformly dispersed, an endless seal member using the heat-resistant seal material, and a downhole apparatus including the endless seal member.

A heat-resistant seal material according to one embodiment of the invention comprises:

100 parts by weight of a ternary fluoroelastomer;

1 to 30 parts by weight of vapor-grown carbon fibers having an average diameter of more than 30 nm and 200 nm or less; and carbon black having an average particle diameter of 25 to 500 nm, the heat-resistant seal material containing the vapor-grown carbon fibers and the carbon black in an amount of 20 to 40 parts by weight in total, and having a compression set when subjected to a compression set test at a compression rate of 25% and a temperature of 200° C. for 70 hours of 0 to 15% and a dynamic modulus of elasticity at 200° C. (E'/200° C.) of 30 to 100 MPa.

The heat-resistant seal material according to this embodiment exhibits excellent chemical resistance due to the ternary fluoroelastomer. Moreover, the heat-resistant seal material exhibits excellent flexibility while maintaining high rigidity at a high temperature by incorporating specific amounts of the vapor-grown carbon fibers having a relatively large diameter and the carbon black having a relatively large particle diameter. Since the heat-resistant seal material has a small compression set at a high temperature, the heat-resistant seal material rarely deteriorates at a high temperature to exhibit excellent seal performance.

In the heat-resistant seal material according to this embodiment, the vapor-grown carbon fibers may have an average diameter of 67 to 176 nm.

In the heat-resistant seal material according to this embodiment, the vapor-grown carbon fibers may be rigid fibers having an average bending index of 5 to 15, the bending index being defined by the following expression (1), $$\text{Bending index} = Lx \div D \tag{1}$$

Lx: length of linear portion of the vapor-grown carbon fiber, and

D: diameter of the vapor-grown carbon fiber.

The heat-resistant seal material according to this embodiment may have a creep instantaneous strain determined by a creep test at a temperature of 260° C. and a load of 1 MPa of 0 to 5% and a creep rate per hour during a steady-state creep period of 20,000 ppm or less.

The heat-resistant seal material according to this embodiment does not break for 15 hours when subjected to the creep test.

The heat-resistant seal material according to this embodiment may comprise the vapor-grown carbon fibers in an amount of 3 to 20 parts by weight, and have a compression set when subjected to a compression set test at a compression rate of 25% and a temperature of 230° C. for 70 hours of 0 to 18% and a dynamic modulus of elasticity at 230° C. (E'/230° C.) of 29 to 70 MPa.

An endless seal member according to one embodiment of the invention is formed by using the above heat-resistant seal material and has an external shape without ends.

The endless seal member according to this embodiment may be an O-ring having a circular horizontal cross-sectional shape.

A downhole apparatus according to one embodiment of the invention comprises the above endless seal member.

Since the endless seal member formed by using the heat-resistant seal material can maintain a high seal performance even at a high pressure and a high temperature, the downhole apparatus according to this embodiment can be used to probe underground resources at deeper locations.

Embodiments of the invention are described in detail below with reference to the drawings.

Figure 2:
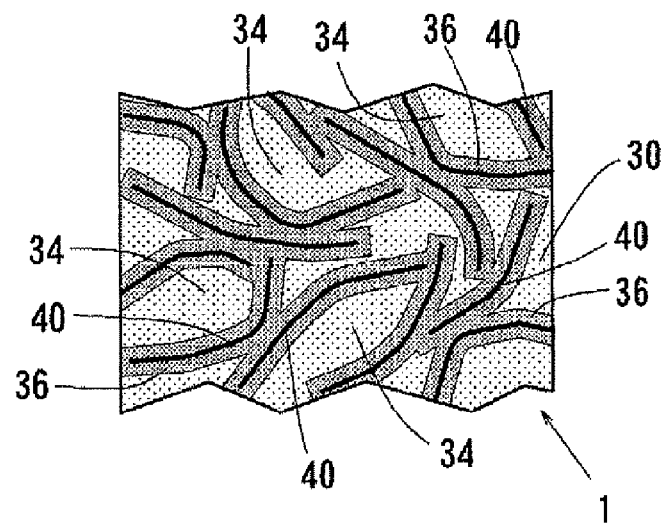
FIG. 2 is a schematic enlarged diagram showing part of a heat-resistant seal material according to one embodiment of the invention.

FIG. 1 is a diagram schematically showing a method of mixing a ternary fluoroelastomer and vapor-grown carbon fibers utilizing an open-roll method employed in one embodiment of the invention. FIG. 2 is an enlarged cross-sectional diagram schematically showing a heat-resistant seal material according to one embodiment of the invention.

(I) Ternary Fluoroelastomer

The ternary fluoroelastomer used in one embodiment of the invention is a synthetic rubber containing a fluorine atom in the molecule. Examples of the ternary fluoroelastomer include a vinylidene fluoride (VDF)-hexafluoropropylene (HFP)-tetrafluoroethylene (TFE) ternary copolymer (VDF-HFP-TFE), a vinylidene fluoride (VDF)-perfluoro(methyl vinyl ether) (FMVE)-tetrafluoroethylene (TFE) ternary copolymer (VDF-HFP-TFE), and the like. The ternary fluoroelastomer preferably has a weight average molecular weight of 50,000 to 300,000. When the weight average molecular weight of the ternary fluoroelastomer is within this range, the ternary fluoroelastomer molecules are entangled and linked. Therefore, the ternary fluoroelastomer exhibits excellent elasticity that allows the vapor-grown carbon fibers to be dispersed. Since the ternary fluoroelastomer has viscosity, the ternary fluoroelastomer easily enters the space between the aggregated vapor-grown carbon fibers. Moreover, since the ternary fluoroelastomer has elasticity, the vapor-grown carbon fibers can be separated. If the weight average molecular weight of the ternary fluoroelastomer is less than 50,000, the ternary fluoroelastomer molecules are not sufficiently entangled. As a result, the vapor-grown carbon fibers may not be dispersed sufficiently due to the low elasticity of the ternary fluoroelastomer, even if a shear force is applied in the subsequent step. If the molecular weight of the ternary fluoroelastomer is greater than 300,000, it may be difficult to process the ternary fluoroelastomer due to too high a hardness.

The network component of the ternary fluoroelastomer has a spin-spin relaxation time ($T2n/30°$ C.), measured for $^1H$ at 30° C. by a Hahn-echo method using a pulsed nuclear magnetic resonance (NMR) technique, of preferably 30 to 100 microseconds, and more preferably 45 to 60 microseconds. If the ternary fluoroelastomer has a spin-spin relaxation time ($T2n/30°$ C.) within the above range, the fluoroelastomer exhibits flexibility and has sufficiently high molecular mobility. Specifically, the fluoroelastomer exhibits elasticity appropriate for dispersing the carbon nanotubes. Moreover, since the fluoroelastomer exhibits viscosity, the fluoroelastomer can easily enter the space between the carbon nanotubes due to high molecular mobility when mixing the fluoroelastomer and the carbon nanotubes. If the spin-spin relaxation time ($T2n/30°$ C.) is shorter than 30 microseconds, the fluoroelastomer may not exhibit sufficient molecular mobility. If the spin-spin relaxation time ($T2n/30°$ C.) is longer than 100 microseconds, the fluoroelastomer tends to flow in the same manner as a liquid, and exhibits low elasticity (although the fluoroelastomer exhibits viscosity). This makes it difficult to disperse the carbon nanotubes in the fluoroelastomer.

The spin-spin relaxation time determined by the Hahn-echo method using the pulsed NMR technique is a measure that indicates the molecular mobility of a substance. Specifically, when measuring the spin-spin relaxation time of the ternary fluoroelastomer by the Hahn-echo method using the pulsed NMR technique, a first component having a shorter first spin-spin relaxation time ($T2n$) and a second component having a longer second spin-spin relaxation time ($T2nn$) are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the ternary fluoroelastomer is. The longer the first spin-spin relaxation time, the higher the molecular mobility and the softer the ternary fluoroelastomer is.

As the measurement method using the pulsed NMR technique, a solid-echo method, a Carr-Purcell-Meiboom-Gill (CPMG) method, or a 90-degree pulse method may be used instead of the Hahn-echo method. However, since the heat-resistant seal material according to the invention has a medium spin-spin relaxation time ($T2$), the Hahn-echo method is most suitable. In general, the solid-echo method and the 90-degree pulse method are suitable for measuring a short spin-spin relaxation time ($T2$), the Hahn-echo method is suitable for measuring a medium spin-spin relaxation time ($T2$), and the CPMG method is suitable for measuring a long spin-spin relaxation time ($T2$).

The ternary fluoroelastomer includes a halogen group having affinity to the vapor-grown carbon fiber (particularly to a terminal radical of the vapor-grown carbon fiber). The vapor-grown carbon fiber generally has a structure in which the side surface is formed of a six-membered ring of carbon atoms and the end is closed by a five-membered ring. Since the vapor-grown carbon fiber has a forced structure, defects tend to occur so that a radical or a functional group tends to be produced at the defective portions. In this embodiment, since at least one of the main chain, side chain, and terminal chain of the ternary fluoroelastomer includes a halogen group having high affinity (reactivity or polarity) to a radical of the vapor-grown carbon fiber, the ternary fluoroelastomer and the vapor-grown carbon fiber can be bonded. This allows the vapor-grown carbon fibers to be easily dispersed despite the aggregating force of the vapor-grown carbon fibers.

It is preferable to mix the uncrosslinked ternary fluoroelastomer according to this embodiment with the vapor-grown carbon fibers.

(II) Vapor-grown Carbon Fiber

The vapor-grown carbon fibers used in this embodiment have an average diameter of more than 30 nm and 200 nm or less. It is preferable that the vapor-grown carbon fibers have an average diameter of 67 to 176 nm. More specifically, it is preferable that the vapor-grown carbon fibers have an average diameter of 67 to 107 nm or 136 to 176 nm and an average length of 5 to 20 micrometers. As the vapor-grown carbon fibers, it is preferable to use multi-walled carbon nanotubes (MWNT) having a shape obtained by rolling up a graphene sheet in the shape of a tube (particularly Vapor-Grown Carbon Fiber (VGCF) (registered trademark of Showa Denko K.K.) having only a small number of defects). The vapor-grown carbon fibers are used in the heat-resistant seal material in an amount of 1 to 30 parts by weight, and preferably 3 to 20 parts by weight, based on 100 parts by weight of the ternary fluoroelastomer. The total amount of the vapor-grown carbon fibers and the carbon black described later in the heat-resistant seal material is 20 to 40 parts by weight.

It is preferable that the vapor-grown carbon fibers be rigid linear fibers having an average bending index of 5 to 15. The bending index indicates the rigidity of the vapor-grown carbon fibers, and is determined by measuring the lengths of the linear portions and the diameters of the vapor-grown carbon fibers photographed using a microscope or the like, and calculating the bending index from the measured values. A bent portion (defect) of a carbon nanofiber such as a vapor-grown carbon fiber photographed using an electron microscope appears as a white line that crosses the fiber in the widthwise direction When the length of the linear portion of the vapor-grown carbon fiber is referred to as Lx and the diameter of the vapor-grown carbon fiber is referred to as D, the bending index is defined by Lx÷D. Therefore, a vapor-grown carbon fiber having a low bending index is bent at a short interval, and a vapor-grown carbon fiber having a high bending index has a long linear portion and is not bent. The length Lx of the linear portion of the vapor-grown carbon fiber according to this embodiment is measured in a state in which a photograph of the vapor-grown carbon fibers taken at a magnification of 10,000 to 50,000 is enlarged by a factor of 2 to 10, for example. A bent portion (defect) that crosses the fiber in the widthwise direction can be observed in the enlarged photograph. The distance between the adjacent bent portions (defects) thus observed is measured at multiple points as the length Lx of the linear portion of the vapor-grown carbon fiber. Multi-walled carbon nanotubes (MWNT) having an average diameter 13 nm have a bending index of about two. Multi-walled carbon nanotubes have a large number of defects and are bent at short intervals as compared with the vapor-grown carbon fibers used in this embodiment.

Such rigid vapor-grown carbon fibers may be produced by a vapor-phase growth method. In the vapor-phase growth method, vapor-grown carbon fibers are synthesized by thermally decomposing hydrocarbons such as benzene or toluene in a vapor phase. Specific examples of the vapor-phase growth method include a floating catalyst method, a zeolite-supported catalyst method, and the like. As the vapor-grown carbon fibers, it is preferable to use Vapor-Grown Carbon Fiber (VGCF) (registered trademark of Showa Denko K.K.) having an average diameter of 150 nm (measured average diameter: 156 nm), an average length of 5 to 20 micrometers, and an average bending index of 5 or more and less than 8, produced by pyrolysis of an organic compound (e.g., benzene, toluene, or natural gas) at 800 to 1300° C. using hydrogen gas in the presence of a transition-metal catalyst (e.g., ferrocene), for example, or vapor-grown carbon fibers having a measured average diameter of 87 nm, an average length of 5 to 20 micrometers, and an average bending index of 8 to 15. The vapor-grown carbon fibers may be graphitized at about 2300 to 3200° C. in the presence of a graphitization catalyst such as boron, boron carbide, beryllium, aluminum, or silicon.

The vapor-grown carbon fibers may be provided with improved adhesion to and wettability with the elastomer by subjecting the vapor-grown carbon fibers to a surface treatment (e.g., ion-injection treatment, sputter-etching treatment, or plasma treatment) before mixing the vapor-grown carbon fibers into the elastomer.

(III) Carbon Black

It is preferable that the carbon black used in this embodiment have an average particle diameter of 25 to 500 nm, and more preferably 70 to 250 nm. The average particle diameter of commercially-available carbon black is provided by the manufacturer. The average particle diameter of the carbon black may be determined by observing the carbon black using an electron microscope and averaging the measured particle diameters. The total amount of the vapor-grown carbon fibers and the carbon black in the heat-resistant seal material is 20 to 40 parts by weight. It is preferable that the carbon black have a DBP absorption of 10 to 150 ml/100 g, and more preferably 15 to 50 ml/100 g. As carbon black which satisfies such conditions, FT carbon black, MT carbon black, and the like are preferable. The ternary fluoroelastomer is reinforced by adding a specific amount of carbon black to the heat-resistant seal material so that the heat-resistant seal material exhibits excellent rigidity and mechanical strength and has a small coefficient of linear expansion. The heat-resistant seal material can be reinforced while maintaining the flexibility of the heat-resistant seal material by allowing the dispersed carbon nanofibers to enclose the fluoroelastomer provided in the openings between the carbon black particles having a relatively large particle diameter to form small cells enclosed by the carbon nanofibers (hereinafter referred to as "cell formation").

(IV) Step of Obtaining Heat-resistant Seal Material

As a step of obtaining the heat-resistant seal material according to this embodiment, an example using an open-roll method with a roll distance of 0.5 mm or less is described below with reference to FIG. 1.

FIG. 1 is a diagram schematically showing an open-roll method using two rolls. In FIG. 1, reference numeral 10 indicates a first roll, and reference numeral 20 indicates a second roll. The first roll 10 and the second roll 20 are disposed at a predetermined distance d (e.g., 1.5 mm). The first and second rolls are rotated normally or reversely. In the example shown in FIG. 1, the first roll 10 and the second roll 20 are rotated in the directions indicated by the arrows.

When causing a ternary fluoroelastomer 30 to be wound around the first roll 10 while rotating the first roll 10 and the second roll 20, a bank 32 of the ternary fluoroelastomer 30 is formed between the first roll 10 and the second roll 20. After the addition of carbon black 42 to the bank 32, the components are mixed. After the addition of vapor-grown carbon fibers 40, the first roll 10 and the second roll 20 are rotated to obtain a mixture of the ternary fluoroelastomer 30, the carbon black 42, and the vapor-grown carbon fibers 40. The mixture is then removed from the open rolls. After reducing the distance d between the first roll 10 and the second roll 20 to preferably 0.5 mm or less, and more preferably 0.1 to 0.5 mm, the mixture is re-supplied to the open rolls and tight-milled. Tight milling is preferably performed about three to ten times, for example. When the surface velocity of the first roll 10 is referred to as V1 and the surface velocity of the second roll 20 is referred to as V2, the surface velocity ratio (V1/V2) of the first roll 10 to the second roll 20 during tight milling is preferably set at 1.05 to 3.00, and more preferably 1.05 to 1.2. A desired shear force can be obtained using such a surface velocity ratio.

This causes a high shear force to be applied to the ternary fluoroelastomer 30 so that the aggregated vapor-grown carbon fibers are removed (separated) one by one by the ternary fluoroelastomer molecules and become dispersed in the ternary fluoroelastomer 30.

Since the carbon black 42 is added to the bank 32 before adding the vapor-grown carbon fibers, turbulent flows occur around the carbon black 42 due to the shear force applied by the rolls so that the vapor-grown carbon fibers can be more uniformly dispersed in the ternary fluoroelastomer 30.

In this step, the ternary fluoroelastomer and the vapor-grown carbon fibers are mixed at a relatively low temperature of preferably 0 to 50° C., and more preferably 5 to 30° C., in order to obtain as high a shear force as possible. Since the ternary fluoroelastomer has rubber elasticity, the vapor-grown carbon fibers can be efficiently dispersed in the matrix by tight milling at such a low temperature.

Since the ternary fluoroelastomer according to this embodiment has the above-described characteristics (i.e., elasticity represented by the molecular configuration (molecular length) and molecular motion, viscosity, and chemical interaction with the vapor-grown carbon fibers), dispersion of the vapor-grown carbon fibers is facilitated. Therefore, a heat-resistant seal material in which the vapor-grown carbon fibers exhibit excellent dispersibility and dispersion stability (i.e., dispersed vapor-grown carbon fibers rarely re-aggregate) can be obtained. Specifically, when mixing the ternary fluoroelastomer and the vapor-grown carbon fibers, the ternary fluoroelastomer having viscosity enters the space between the vapor-grown carbon fibers while a specific portion of the ternary fluoroelastomer is bonded to a highly active portion of the vapor-grown carbon fiber due to chemical interaction. When a high shear force is applied to the mixture of the vapor-grown carbon fibers and the ternary fluoroelastomer having an appropriately long molecular length and high molecular mobility (elasticity), the vapor-grown carbon fibers move along with the movement of the ternary fluoroelastomer. The aggregated vapor-grown carbon fibers are separated due to the restoring force of the shorn ternary fluoroelastomer due to elasticity, and become dispersed in the ternary fluoroelastomer. According to this embodiment, when the mixture is extruded through the narrow space between the rolls, the mixture is deformed to have a thickness greater than the roll distance as a result of the restoring force of the ternary fluoroelastomer due to elasticity. It is thought that the above-mentioned deformation causes the mixture to which a high shear force is applied to flow in a more complicated manner so that the vapor-grown carbon fibers are dispersed in the ternary fluoroelastomer. The dispersed vapor-grown carbon fibers are prevented from re-aggregating due to chemical interaction with the ternary fluoroelastomer to exhibit excellent dispersion stability.

The step of dispersing the vapor-grown carbon fibers in the ternary fluoroelastomer by applying a shear force may be carried out using an internal mixing method or a multi-screw extrusion kneading method instead of the above-described open-roll method. In other words, it suffices that a shear force sufficient to separate the aggregated vapor-grown carbon fibers be applied to the ternary fluoroelastomer.

The heat-resistant seal material obtained by this step (mixing/dispersion step) may be crosslinked using a crosslinking agent, and then molded. In the mixing/dispersion step or the subsequent step, a compounding ingredient normally used when processing a ternary fluoroelastomer such as rubber may be added. Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, and the like.

(V) Heat-resistant Seal Material

FIG. 2 is an enlarged cross-sectional diagram schematically showing the heat-resistant seal material according to this embodiment. In a heat-resistant seal material 1 according to this embodiment obtained by the above-described step, carbon black (not shown) and the carbon nanofibers 40 are uniformly dispersed in the ternary fluoroelastomer 30 (matrix). An interfacial phase 36 (i.e., an aggregate of molecules of the ternary fluoroelastomer 30 adhering to the surface of the vapor-grown carbon fiber 40) is formed around the vapor-grown carbon fiber 40. The interfacial phase 36 is considered to be similar to a bound rubber formed around carbon black when mixing a ternary fluoroelastomer and carbon black, for example. The interfacial phase 36 covers and protects the vapor-grown carbon fibers 40. The interfacial phases 36 are linked as the amount of vapor-grown carbon fibers in the heat-resistant seal material 1 increases to form small cells 34. When the vapor-grown carbon fibers 40 are contained in the heat-resistant seal material 1 in an optimum amount, the amount of oxygen that enters the cells 34 in the heat-resistant seal material 1 decreases due to the linked interfacial phases 36 so that thermal degradation rarely occurs even at a high temperature. Therefore, a high modulus of elasticity can be maintained. Moreover, the heat-resistant seal material 1 shows a small creep instantaneous strain even at a high temperature and maintains a low creep rate during a steady-state creep period to exhibit high heat resistance. The carbon black (omitted in FIG. 2) is uniformly dispersed in the matrix together with the vapor-grown carbon fibers and linked with a bound rubber around the carbon black to form the small cells 34.

The optimum content of the vapor-grown carbon fibers in the heat-resistant seal material 1 is obtained by adding 1 to 30 parts by weight of vapor-grown carbon fibers having an average diameter of more than 30 nm and 200 nm or less and carbon black having an average particle diameter of 25 to 500 nm to 100 parts by weight of the ternary fluoroelastomer. The total amount of the vapor-grown carbon fibers and the carbon black in the heat-resistant seal material is 20 to 40 parts by weight.

The heat-resistant seal material 1 has a compression set when subjected to a compression set test at a compression rate of 25% and a temperature of 200° C. for 70 hours of 0 to 15% and a dynamic modulus of elasticity (E'/200° C.) at 200° C. of 30 to 100 MPa. The heat-resistant seal material preferably has a creep instantaneous strain determined by a creep test at a temperature of 260° C. and a load of 1 MPa of 0 to 5% and a creep rate per hour during a steady-state creep period of 20,000 ppm or less. It is preferable that the heat-resistant seal material does not break for 15 hours, and more preferably 50 hours, when subjected to the creep test. The heat-resistant seal material 1 preferably includes 3 to 20 parts by weight of the vapor-grown carbon fibers based on 100 parts by weight of the ternary fluoroelastomer. The heat-resistant seal material 1 has a compression set when subjected to a compression set test at a compression rate of 25% and a temperature of 230° C. for 70 hours of 0 to 18% and a dynamic modulus of elasticity (E'/230° C.) at 230° C. of 29 to 70 MPa. The heat-resistant seal material has high rigidity (particularly at a high temperature (200° C. or more)) due to the reinforcing effect of the vapor-grown carbon fibers. When adding carbon nanofibers to a ternary fluoroelastomer, the elongation at break of the heat-resistant seal material 1 tends to be smaller than that of the ternary fluoroelastomer According to this embodiment, the rigidity of the heat-resistant seal material 1 can be improved while improving flexibility by uniformly dispersing the vapor-grown carbon fibers having a relatively large diameter in the ternary fluoroelastomer. This is considered to be because the vapor-grown carbon fibers prevent a situation in which the heat-resistant seal material breaks due to stress concentration on defects in the heat-resistant seal material. The heat-resistant seal material has a small compression set and rarely deteriorates at a high temperature to maintain a high seal performance. When subjecting the heat-resistant seal material to the creep test, the heat-resistant seal material undergoes a creep instantaneous strain (i.e., the amount of instantaneous deformation when load is applied), a steady-state creep period (i.e., the creep rate is stable), and an accelerating creep period (i.e., the strain rapidly increases), and then breaks. As the creep rate per hour during the steady-state creep period decreases, the period of time until a transition to the accelerating creep period occurs increases, and the period of time until breakage (destruction) occurs increases. Therefore, the heat-resistant seal material 1 shows a small creep instantaneous strain even at a high temperature and maintains a low creep rate during a steady-state creep period to exhibit high heat resistance.

The heat-resistant seal material 1 in uncrosslinked form has a first spin-spin relaxation time (T2n), measured for $^1$H at 150° C. by the Hahn-echo method using the pulsed NMR technique, of 600 to 1000 microseconds, and a fraction (fnn) of components having a second spin-spin relaxation time (T2nn) of less than 0.2.

The first spin-spin relaxation time (T2n) and the fraction (fnn) of a rubber composition indicate whether or not carbon nanofibers are uniformly dispersed in an elastomer as a matrix. Specifically, when the carbon nanofibers are uniformly dispersed in the ternary fluoroelastomer, the ternary fluoroelastomer molecules are restrained by the carbon nanofibers. The mobility of the ternary fluoroelastomer molecules restrained by the carbon nanofibers is smaller than that when the ternary fluoroelastomer molecules are not restrained by the carbon nanofibers. Therefore, the first spin-spin relaxation time (T2n), the second spin-spin relaxation time (T2nn), and the spin-lattice relaxation time (T1) of the heat-resistant seal material 1 according to this embodiment in uncrosslinked form are shorter than those of the fluoroelastomer which does not include the carbon nanofibers. In particular, the first spin-spin relaxation time (T2n), the second spin-spin relaxation time (T2nn), and the spin-lattice relaxation time (T1) are further reduced by uniformly dispersing the carbon nanofibers.

When the ternary fluoroelastomer molecules are restrained by the carbon nanofibers, the number of non-network components (non-reticulate chain components) is considered to be reduced for the following reasons. Specifically, when the molecular mobility of the entire ternary fluoroelastomer has decreased due to the carbon nanofibers, the non-network components tend to behave in the same manner as the network components. Moreover, since the non-network components (terminal chains) easily move, the non-network components tend to be adsorbed on the active sites of the carbon nanofibers. It is considered that these phenomena decrease the number of non-network components. Therefore, the fraction (fnn) of components having the second spin-spin relaxation time (T2nn) becomes smaller than that of the fluoroelastomer which does not include the carbon nanofibers. Note that the fraction (fn) of components having the first spin-spin relaxation time (T2n) becomes greater than that of the ternary fluoroelastomer which does not include the carbon nanofibers, since fn+fnn=1.

A seal member produced using the heat-resistant seal material may be used as a gasket used for a stationary portion or a gasket used for a movable portion. An example of such a seal member is an endless seal member having an external shape without ends. The external shape of the endless seal member may be circular or polygonal corresponding to the shape of a groove or a member in which the seal member is disposed, for example. The endless seal member may be an O-ring having a circular horizontal cross-sectional shape.

(VI) Downhole Apparatus Including Endless Seal Member

Figure 3:
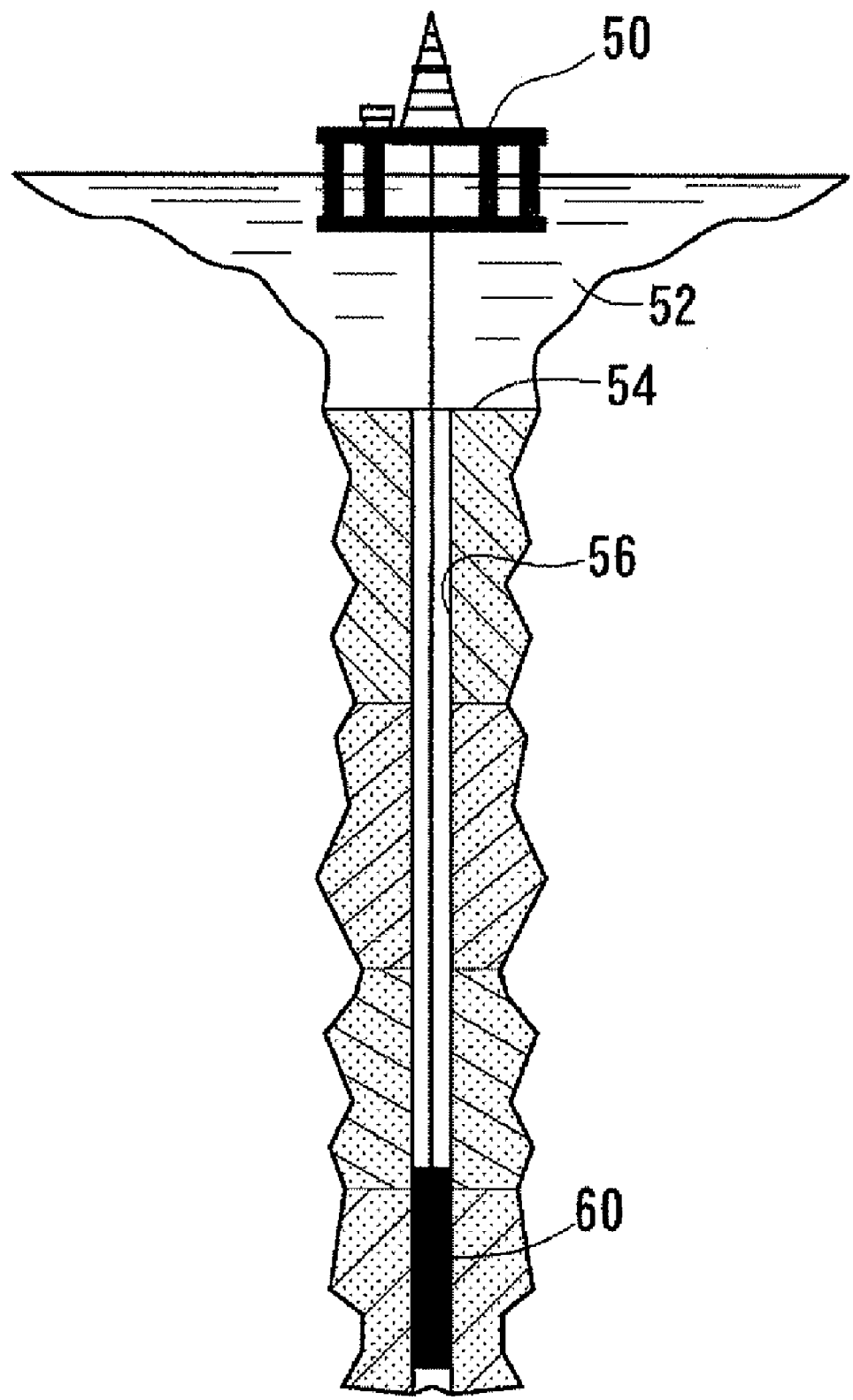
FIG. 3 is a schematic diagram illustrative of a downhole apparatus in use.
Figure 4:
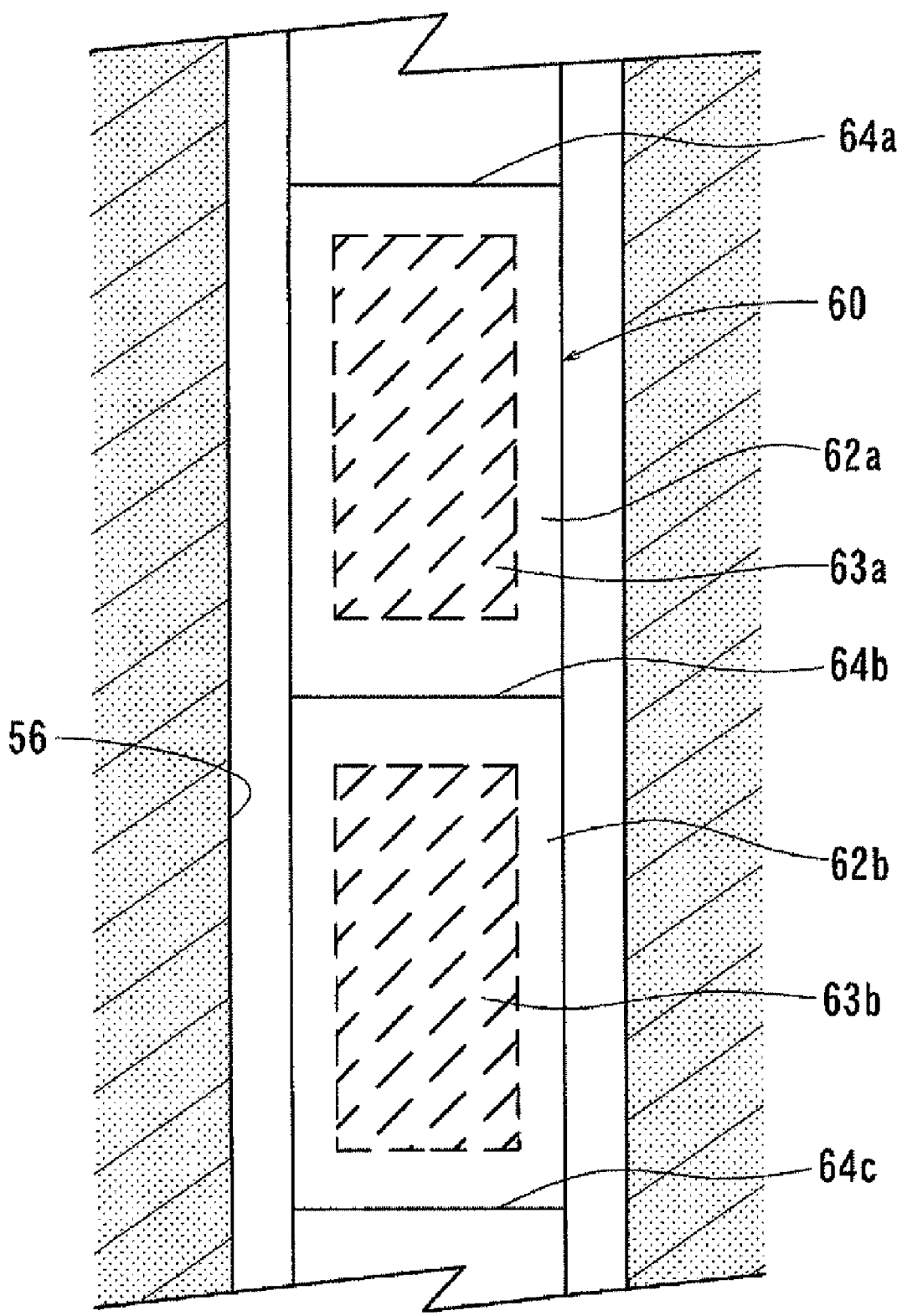
FIG. 4 is a schematic diagram showing part of a downhole apparatus.
Figure 5:
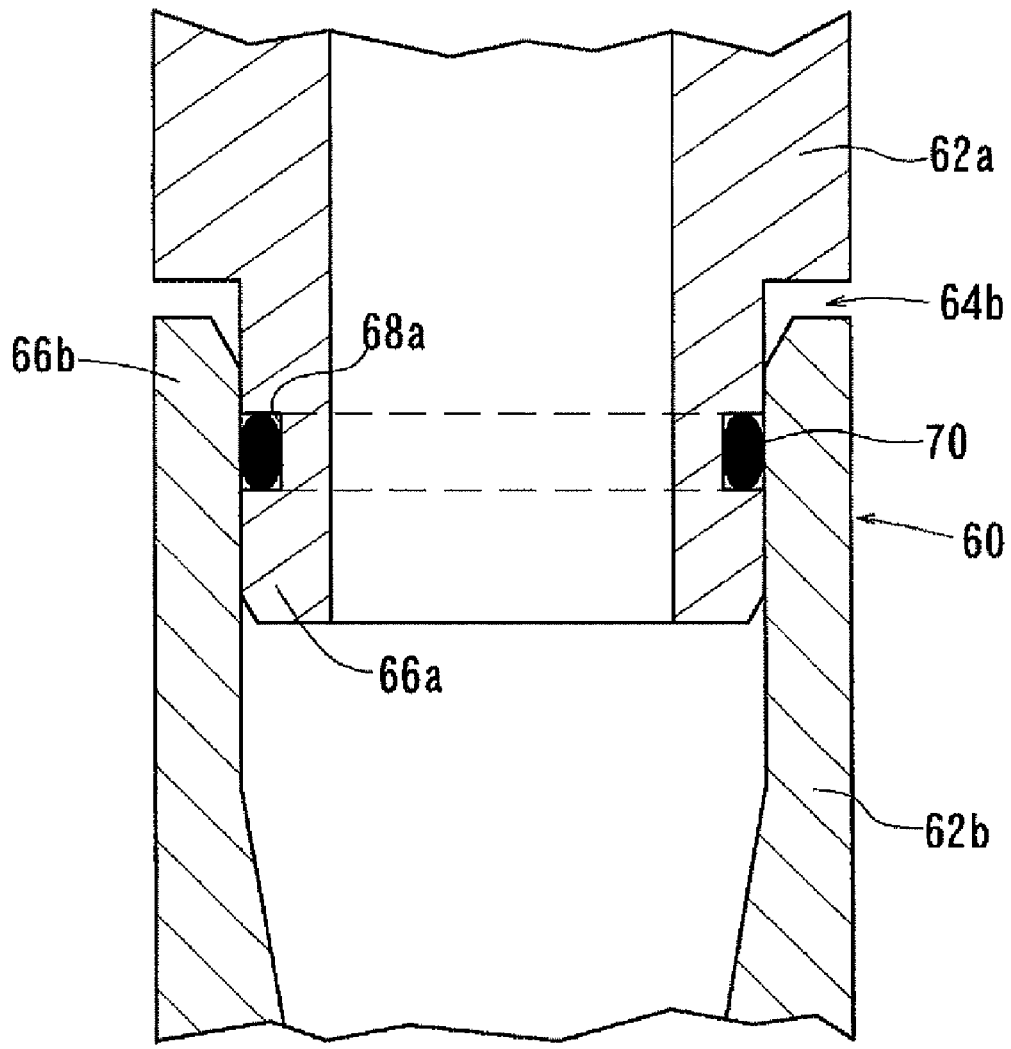
FIG. 5 is a vertical cross-sectional diagram showing a pressure vessel connection portion of a downhole apparatus.
Figure 6:
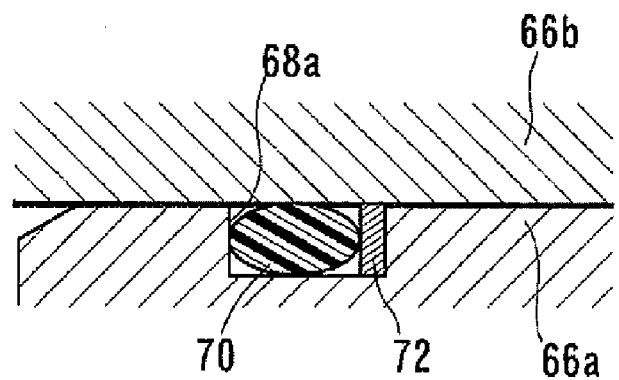
FIG. 6 is a vertical cross-sectional diagram showing another method of using an O-ring for a downhole apparatus.
Figure 7:
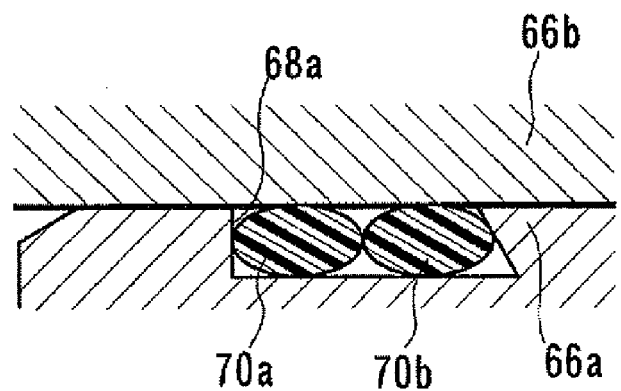
FIG. 7 is a vertical cross-sectional diagram showing still another method of using an O-ring for a downhole apparatus.

FIG. 3 is a schematic diagram illustrative of a downhole apparatus in use. FIG. 4 is a schematic diagram showing part of a downhole apparatus. FIG. 5 is a vertical cross-sectional diagram showing a pressure vessel connection portion of a downhole apparatus. FIG. 6 is a vertical cross-sectional diagram showing another method of using an O-ring for a downhole apparatus. FIG. 7 is a vertical cross-sectional diagram showing still another method of using an O-ring for a downhole apparatus.

As shown in FIG. 3, when searching for underground resources, a downhole apparatus 60 is caused to advance in a well 56 (vertical or horizontal passageway) formed in an ocean floor 54 from a platform 50 on the sea 52, and the underground structure and the like are probed to determine the presence or absence of the target substance (e.g., petroleum), for example. The downhole apparatus 60 is secured on the end of a long rod extending from the platform, for example. The downhole apparatus 60 includes a plurality of pressure vessels 62a and 62b shown in FIG. 4, and may also include a drill bit (not shown) at the end. The adjacent pressure vessels 62a and 62b are liquid-tightly connected through connection portions 64a, 64b, and 64c on either end. Electronic instruments 63a and 63b (e.g., sonic logging system) are respectively enclosed in the pressure vessels 62a and 62b so that the underground structure can be probed.

As shown in FIG. 5, an end 66a of the pressure vessel 62a has a cylindrical shape having an outer diameter smaller to some extent than the inner diameter of an end 66b of the pressure vessel 62b. An endless seal member (e.g., O-ring 70) is provided in a groove 68a formed in the outer circumferential surface of the end 66a. The O-ring 70 is a circular endless seal member formed using the heat-resistant seal material and having an external shape without ends. The O-ring 70 has a circular horizontal cross-sectional shape. The connection portion 64b between the pressure vessels 62a and 62b is liquid-tightly sealed by inserting the end 66a of the pressure vessel 62a into the end 66b of the pressure vessel 62b so that the O-ring 70 is flatly deformed. Since the downhole apparatus 60 is operated in the well 56 formed deep in the ground, it is necessary to liquid-tightly keep the pressure vessels 62a and 62b at a high pressure and a high temperature. In the O-ring 70 for the downhole apparatus 60 according to this embodiment, the elastomer deteriorates to only a small extent at a high temperature. Moreover, the O-ring 70 can maintain excellent flexibility and strength at a high temperature.

As shown in FIG. 6, a resin back-up ring 72 may be provided in the groove 68a in addition to the O-ring 70, for example. As shown in FIG. 7, two O-rings 70a and 70b may be provided in the groove 68a to improve the seal performance, for example.

Examples according to the invention are described below. Note that the invention is not limited to the following examples.

EXAMPLES 1 TO 9 AND COMPARATIVE EXAMPLES 1 TO 3

(1) Preparation of Sample
(a) Preparation of Heat-resistant Seal Material

Step 1: 100 parts by weight (phr) of a fluoroelastomer shown in Tables 1 and 2 (indicated by "ternary FKM" and "binary FKM" in Tables 1 and 2) was supplied to rolls having a roll diameter of six inches (roll temperature: 10 to 20° C.), and wound around the roll.

Step 2: Additives including vapor-grown carbon fibers (indicated by "vapor-grown carbon 87 nm" and "vapor-grown carbon 156 nm" in Tables 1 and 2), triallyl isocyanate (indicated by "TAIC" in Tables 1 and 2), a peroxide, and carbon black (indicated by "MT carbon" and "FT carbon" in Tables 1 and 2) were added to the elastomer in amounts (parts by weight (phr)) shown in Tables 1 and 2. The roll distance was set at 1.5 mm.

Step 3: After the addition of the additives, the mixture was removed from the rolls.

Step 4: After reducing the roll distance from 1.5 mm to 0.3 mm, the mixture was re-supplied to the rolls and tight-milled. The surface velocity ratio of the two rolls was set at 1.1. Tight milling was repeated ten times.

Step 5: After setting the roll distance at another predetermined distance (1.1 mm), the tight-milled material was re-supplied to the rolls and sheeted to obtain an uncrosslinked composite material.

Step 6: After rolling the resulting composite material, the composite material was pressed (cured) at 170° C. for 10 minutes. The cured material was post-cured at 200° C. for 24 hours to obtain crosslinked heat-resistant seal materials (sheets having a thickness of 1 mm) of Examples 1 to 9 and Comparative Examples 1 and 2.

In Tables 1 and 2, "vapor-grown carbon 87 nm" indicates vapor-grown carbon fibers having a measured average diameter of 87 nm and an average bending index of 9.9, and vapor-grown carbon 156 mm indicates VGCF (registered trademark of Showa Denko K.K.) having a measured average diameter of 156 nm and an average bending index of 6.8. The average diameter and the average bending index of the vapor-grown carbon fibers ("vapor-grown carbon 87 nm" and "vapor-grown carbon 156 nm" in Tables 1 and 2) were measured using a photograph taken using an electron microscope (SEM). The average bending index was determined by measuring the length (interval between the adjacent defects) Lx of the linear portion and the diameter D of the fibers, calculating the bending indices (Lx/D) at 200 points using the measurement results, and dividing the bending indices by the number of measurement points (i.e., 200). In Tables 1 and 2, "binary FKM" indicates a binary fluoroelastomer ("Viton A" manufactured by DuPont Dow Elastomers Japan, T2n/30° C.: 55 microseconds), and "ternary FKM" indicates a ternary fluoroelastomer ("Viton GF-600S" manufactured by DuPont Dow Elastomers Japan, weight average molecular weight: 50,000, T2n/30° C.: 50 microseconds). In Tables 1 and 2, "MT carbon" indicates MT carbon black having an average particle diameter of 200 nm and a DBP absorption of 25 ml/100 g, and "FT carbon" indicates FT carbon black having an average particle diameter of 120 nm and a DBP absorption of 42 ml/100 g.

(b) Production of O-ring

The composite material having a predetermined thickness obtained by the step 5 was punched in the shape of a ring. The resulting product was placed in an O-ring mold, pressed (cured) at 170° C. for 10 minutes, and then post-cured at 200° C. for 24 hours to obtain O-rings of Example 3 and Comparative Examples 1 and 2. The O-ring had a circular endless external shape having a thickness of 2.62 mm and an inner diameter of 9.19 mm. The O-ring had a circular horizontal cross-sectional shape. An O-ring currently used for a downhole apparatus was provided as Comparative Example 3.

(2) Measurement Using Pulsed NMR Technique

The uncrosslinked composite material samples obtained by the step 5 in Examples 1 to 9 and Comparative Examples 1 and 2 were subjected to measurement by the Hahn-echo method using the pulsed NMR technique. An instrument "JMN-MU25" (manufactured by JEOL, Ltd.) was used for the measurement. The measurement was conducted under conditions of an observing nucleus of $^1H$, a resonance frequency of 25 MHz, and a 90-degree pulse width of 2 microseconds. A decay curve was determined using the pulse sequence (90° x-Pi-180° x) of the Hahn-echo method. The characteristic relaxation time (T2'/150° C.) at 150° C. and the fraction (fnn) of components having a second spin-spin relaxation time (T2nn) of the composite material sample were determined. The measurement results are shown in Tables 1 and 2. The characteristic relaxation time (T2'/30° C.) of the binary FKM was 55 microseconds, and the characteristic relaxation time (T2'/30° C.) of the ternary FKM was 50 microseconds.

(3) Measurement of Hardness

The rubber hardness (JIS-A) of the heat-resistant seal material samples of Examples 1 to 9 and Comparative Examples 1 and 2 was measured in accordance with JIS K 6253. The measurement results are shown in Tables 3 and 4.

(4) Measurement of 50% Modulus (M50)

The heat-resistant seal material samples (width: 5 mm, length: 50 mm, thickness: 1 mm) of Examples 1 to 9 and Comparative Examples 1 and 2 were stretched at a rate of 10 mm/min, and the stress (M50: 50% modulus (MPa)) when the sample was deformed by 50% was determined. The measurement results are shown in Tables 3 and 4.

(5) Measurement of Tensile Strength (TB) and Elongation at Break (EB)

Specimens prepared by cutting the heat-resistant seal material samples of Examples 1 to 9 and Comparative Examples 1 and 2 in the shape of a 1 A dumbbell were subjected to a tensile test in accordance with JIS K 6251 at a temperature of 23±2° C. and a tensile rate of 500 mm/min using a tensile tester (manufactured by Toyo Seiki Seisaku-sho, Ltd.) to measure the tensile strength (MPa) and the elongation at break (%). The measurement results are shown in Tables 3 and 4.

(6) Compression Set Test

The compression set (JIS K 6262) of the heat-resistant seal material samples of Examples 1 to 9 and Comparative Examples 1 and 2 was measured. The compression set test was conducted at a compression rate of 25% and a temperature of 200° C. for 70 hours and at a compression rate of 25% and a temperature of 230° C. for 70 hours. The measurement results are shown in Tables 3 and 4. The compression set indicates the deterioration resistance of the heat-resistant seal material at a high temperature.

(7) Heat Aging Test

The tensile strength (MPa) and the elongation at break (%) of the heat-resistant seal material samples of Examples 1 to 9 and Comparative Examples 1 and 2 which had been allowed to stand at 200° C. for 70 hours were measured to determine the change rate with respect to the tensile strength (TB) and the elongation at break (EB) at 23° C. The measurement results are shown in Tables 3 and 4.

(8) Dynamic Viscoelasticity Test

Specimens were prepared by cutting the heat-resistant seal material samples of Examples 1 to 9 and Comparative Examples 1 and 2 in the shape of a strip (40×1×5 (width) mm). Each specimen was subjected to a dynamic viscoelasticity test using a dynamic viscoelasticity tester DMS6100 manufactured by SII at a chuck distance of 20 mm, a measurement temperature of −100 to 300° C., a dynamic strain of ±0.05%, and a frequency of 10 Hz in accordance with JIS K 6394 to measure the dynamic modulus of elasticity (E', MPa). Tables 3 and 4 show the measurement results for the dynamic modulus of elasticity (E') at a measurement temperature of 200° C., 230° C., and 260° C.

(9) Measurement of Creep Characteristics

The heat-resistant seal material samples of Examples 1 to 9 and Comparative Examples 1 and 2 were subjected to a creep test at a temperature of 260° C. and a load of 1 MPa for 50 hours to measure the creep instantaneous strain and the creep rate per hour during a steady-state creep period. The creep instantaneous strain refers to the instantaneous elongation when a load of 250 KPa is applied. The creep rate refers to a change in strain (1 ppm=0.0001%) per hour in a steady-state creep period which occurs after the creep instantaneous strain, but before an accelerating creep period. The measurement results are shown in Tables 3 and 4.

(10) 5% Compressive Stress Test

A stress (MPa) when compressing the O-rings of Example 3 and Comparative Examples 1 to 3 by 5% at 200° C. and 260° C. was measured. The measurement results are shown in Table 5.

(11) Pressure Test

Figure 8:
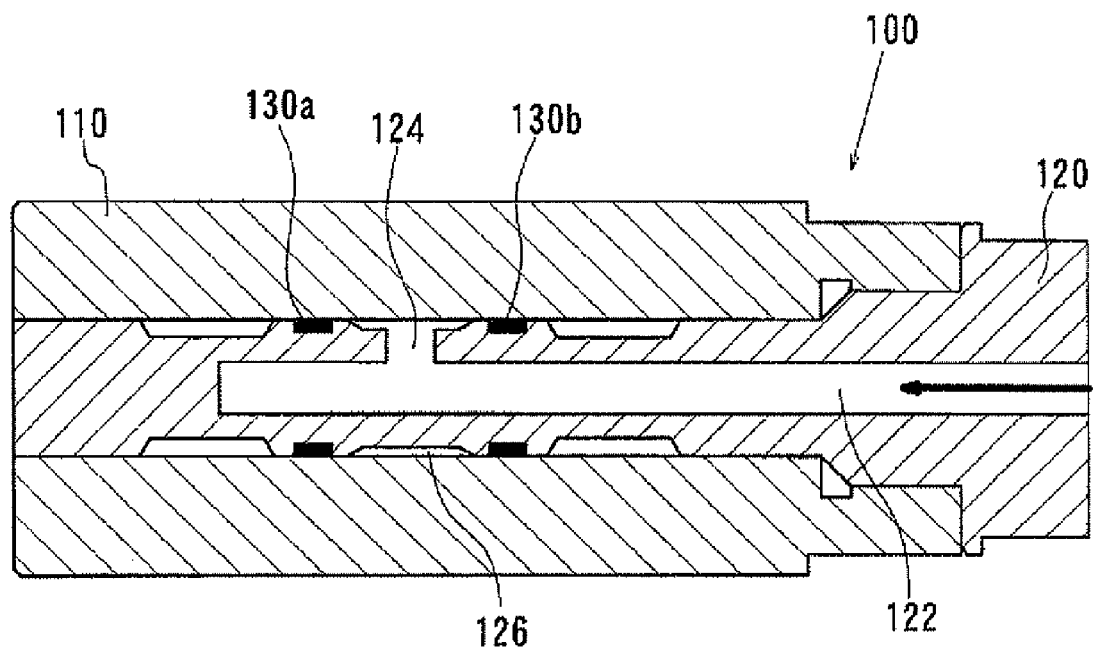
FIG. 8 is a schematic vertical cross-sectional diagram showing a pressure tester used for O-rings obtained in Example 3 and Comparative Examples 1 to 3.

The O-rings of Example 3 and Comparative Examples 1 to 3 were placed in a pressure tester 100 shown in FIG. 8, and subjected to a pressure test at 175° C., 230° C., and 260° C. The pressure tester 100 has a joint structure in which an insertion member 120 having oil passages 122 and 124 is inserted into a tubular member 110. Three circular grooves are formed in the outer circumferential surface of the insertion member 120. The center circular groove communicates with the oil passage 124 so that a circular oil passage 126 is formed between the insertion member 120 and the inner circumferential surface of the tubular member 110. O-rings 130a and 130b are provided in circular grooves formed on either side of the circular oil passage 126 at a distance from the circular oil passage 126. The O-rings 130a and 130b are pressed against the inner circumferential surface of the tubular member 110 to liquid-tightly seal the tubular member 110 and the insertion member 120. In the pressure test, the pressure tester 100 was held at a temperature of 175 to 260° C., and a silicone oil was injected through the open end of the oil passage 122. The seal performance was monitored for 20 minutes while increasing the pressure applied to the silicone oil by 13.8 MPa. When leakage did not occur, the pressure applied to the silicone oil was increased by 13.8 MPa. The test was stopped when leakage occurred. The maximum pressure applied to the silicone oil without leakage is shown in Table 5.

TABLE 1

| | | | Example 1 | Example 2 | Example 3 | Example 4 | Example 5 | Example 6 | Example 7 |
|---|---|---|---|---|---|---|---|---|---|
| Composition of heat-resistant seal material | Ternary FKM | phr | 100 | 100 | 100 | 100 | 100 | 100 | 100 |
| | Binary FKM | phr | 0 | 0 | 0 | 0 | 0 | 0 | 0 |
| | TAIC | phr | 3 | 3 | 3 | 3 | 5 | 3 | 3 |
| | Peroxide | phr | 2 | 2 | 2 | 2 | 3 | 2 | 2 |
| | MT carbon | phr | 30 | 20 | 20 | 20 | 20 | 5 | 0 |
| | FT carbon | phr | 0 | 0 | 0 | 0 | 0 | 0 | 20 |
| | Vapor-grown carbon 87 nm | phr | 1 | 3 | 7 | 12 | 7 | 30 | 7 |
| | Vapor-grown carbon 156 nm | phr | 0 | 0 | 0 | 0 | 0 | 0 | 0 |
| Measurement results for uncrosslinked form using pulsed NMR technique | T2' (150° C.) | μsec | 930 | 880 | 830 | 790 | 710 | 710 | 770 |
| | fnn (150° C.) | | 0.19 | 0.18 | 0.1 | 0.06 | 0.09 | 0 | 0.08 |

TABLE 2

| | | | Example 8 | Example 9 | Comparative Example 1 | Comparative Example 2 |
|---|---|---|---|---|---|---|
| Composition of heat-resistant seal material | Ternary FKM | phr | 100 | 100 | 100 | 0 |
| | Binary FKM | phr | 0 | 0 | 0 | 100 |
| | TAIC | phr | 3 | 3 | 3 | 3 |
| | Peroxide | phr | 2 | 2 | 2 | 2 |
| | MT carbon | phr | 20 | 5 | 30 | 20 |
| | FT carbon | phr | 0 | 0 | 0 | 0 |
| | Vapor-grown carbon 87 nm | phr | 0 | 0 | 0 | 7 |
| | Vapor-grown carbon 156 nm | phr | 7 | 30 | 0 | 0 |
| Measurement results for uncrosslinked form using pulsed NMR technique | T2' (150° C.) | μsec | 890 | 770 | 1100 | 1300 |
| | fnn (150° C.) | | 0.16 | 0.05 | 0.32 | 0.2 |

TABLE 3

|  |  |  | Example 1 | Example 2 | Example 3 | Example 4 | Example 5 | Example 6 | Example 7 |
|---|---|---|---|---|---|---|---|---|---|
| Properties of heat-resistant seal material | Hardness | JIS A | 92 | 92 | 95 | 95 | 95 | 95 | 95 |
|  | M50 | MPa | 12.8 | 13.2 | 14.7 | 18.4 | 16.2 | 18.8 | 16.9 |
|  | Tensile strength (TB) | MPa | 21.1 | 21.3 | 21.3 | 24.2 | 21.9 | 23.7 | 23.1 |
|  | Elongation at break (EB) | % | 120 | 100 | 90 | 80 | 80 | 50 | 70 |
|  | Compression set/200° C. | % (70 hours) | 5 | 7 | 10 | 10 | 7 | 15 | 9 |
|  | Compression set/230° C. | % (70 hours) | 11 | 13 | 14 | 16 | 13 | 27 | 13 |
|  | Thermal degradation ΔTB (200° C., 70 h) | % | 6 | 6 | 6 | 3 | −11 | 35 | 5 |
|  | Thermal degradation ΔEB (200° C., 70 h) | % | 2 | 2 | 2 | −9 | 0 | 6 | 1 |
|  | E'/200° C. | MPa | 31 | 33 | 55 | 62 | 51 | 85 | 78 |
|  | E'/230° C. | MPa | 28 | 30 | 50 | 54 | 45 | 73 | 68 |
|  | E'/250° C. | MPa | 27 | 28 | 48 | 52 | 43 | 72 | 66 |
|  | Creep instantaneous strain | % | 3.9 | 3.8 | 2.6 | 2.4 | 2.8 | 2.6 | 1.9 |
|  | Creep rate | ppm/hour | 18000 | 19000 | 8100 | 6200 | 8700 | 8100 | 7700 |
|  | Chemical resistance | Silicone oil | Good | Good | Good | Good | Good | Good | Good |

TABLE 4

|  |  |  | Example 8 | Example 9 | Comparative Example 1 | Comparative Example 2 |
|---|---|---|---|---|---|---|
| Properties of heat-resistant seal material | Hardness | JIS A | 90 | 91 | 92 | 95 |
|  | M50 | MPa | 12.1 | 15.2 | 10.1 | 17.2 |
|  | Tensile strength (TB) | MPa | 20.5 | 22.5 | 19.4 | 24.1 |
|  | Elongation at break (EB) | % | 130 | 80 | 100 | 90 |
|  | Compression set/200° C. | % (70 hours) | 7 | 12 | 7 | 21 |
|  | Compression set/230° C. | % (70 hours) | 12 | 19 | 11 | 30 |
|  | Thermal degradation ΔTB (200° C., 70 h) | % | 6 | 10 | 1.0 | −7.0 |
|  | Thermal degradation ΔEB (200° C., 70 h) | % | 2 | 3 | −5.0 | −11.0 |
|  | E'/200° C. | MPa | 44 | 61 | 23.0 | 50.0 |
|  | E'/230° C. | MPa | 41 | 48 | 21 | 44 |
|  | E'/250° C. | MPa | 40 | 44 | 20.0 | 42.0 |
|  | Creep instantaneous strain | % | 3.3 | 3.2 | 6.8 | 2 |
|  | Creep rate | ppm/hour | 13000 | 11000 | Broke after 12 hours | 1640 |
|  | Chemical resistance | Silicone oil | Good | Good | Good | Poor |

TABLE 5

|  |  |  |  | Example 3 | Comparative Example 1 | Comparative Example 2 | Comparative Example 3 |
|---|---|---|---|---|---|---|---|
| Properties of O-ring | 5% compressive stress | 200° C. | N | 1.14 | 0.91 | 0.95 | 0.87 |
|  |  | 260° C. | N | 1.09 | 0.89 | 0.74 | 0.77 |
|  | Pressure test | 175° C. | Pa (maximum pressure) | 2060 | 1920 | 1920 | 1770 |
|  |  | 230° C. | Pa (maximum pressure) | 2080 | 1370 | 1510 | 1220 |
|  |  | 260° C. | Pa (maximum pressure) | 2080 | 1500 | 1500 | 1120 |

As shown in Table 1, the following items were confirmed by Examples 1 to 9 according to the invention. Specifically, the O-ring using the heat-resistant seal material of Example 3 according to the invention did not undergo leakage up to 260° C. in the downhole apparatus pressure test. Since a high-temperature pressure test for the O-ring requires considerable time and cost, the high-temperature pressure resistance of the O-ring was estimated based on the experimental results for Example 3 and Comparative Examples 1 to 3 by conducting various property tests on the heat-resistant seal material. The O-ring of Comparative Example 3 currently used for a downhole apparatus passed the pressure test at 175° C., but showed leakage during the pressure test at 230° C. or more.

The heat-resistant seal materials of Examples 1 to 9 according to the invention had a compression set at a compression rate of 25% and a temperature of 200° C. for 70 hours of 0 to 15% and a dynamic modulus of elasticity (E'/200° C.) at 200° C. of 30 to 100 MPa. Therefore, it is estimated that O-rings produced using the heat-resistant seal materials of Examples 1 to 9 according to the invention pass the pressure test at 200° C. or more. The heat-resistant seal materials of Examples 1 to 9 according to the invention did not break for 15 hours when subjected to the creep test. In particular, the heat-resistant seal materials of Examples 2 to 5, 7, and 8 according to the invention contained the vapor-grown carbon fibers in an amount of 3 to 20 parts by weight, and have a compression set when subjected to a compression set test at a compression rate of 25% and a temperature of 230° C. for 70 hours of 0 to 18% and a dynamic modulus of elasticity (E'/230° C.) at 230° C. of 29 to 70 MPa. Therefore, it is estimated that O-rings produced using the heat-resistant seal materials of Examples 2 to 5, 7, and 8 according to the invention pass the pressure test at 230° C. or more.

The heat-resistant seal materials of Examples 1 to 9 according to the invention had a hardness of 90 to 95, M50 of 12 to 20 MPa, a tensile strength (TB) of 20 to 30 MPa, and an elongation at break (EB) of 70 to 200%. Since the binary FKM was used for the heat-resistant seal material of Comparative Example 2, the heat-resistant seal material exhibited insufficient chemical resistance, although other properties were good. Therefore, an O-ring for a downhole apparatus cannot be produced using the heat-resistant seal material of Comparative Example 2.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A heat-resistant seal material comprising:
   100 parts by weight of a ternary fluoroelastomer;
   1 to 30 parts by weight of vapor-grown carbon fibers having an average diameter of more than 30 nm and 200 nm or less; and
   carbon black having an average particle diameter of 25 to 500 nm,
   the heat-resistant seal material containing the vapor-grown carbon fibers and the carbon black in an amount of 20 to 40 parts by weight in total, and having a compression set when subjected to a compression set test at a compression rate of 25% and a temperature of 200° C. for 70 hours of 0 to 15% and a dynamic modulus of elasticity at 200° C. (E'/200° C.) of 30 to 100 MPa.

2. The heat-resistant seal material as defined in claim 1, wherein the vapor-grown carbon fibers have an average diameter of 67 to 176 nm.

3. The heat-resistant seal material as defined in claim 1, wherein the vapor-grown carbon fibers are rigid fibers having an average bending index of 5 to 15, the bending index being defined by the following expression (1), $$\text{Bending index} = Lx \div D \tag{1}$$

Lx: length of linear portion of the vapor-grown carbon fiber, and

D: diameter of the vapor-grown carbon fiber.

4. The heat-resistant seal material as defined in claim 1, having a creep instantaneous strain determined by a creep test at a temperature of 260° C. and a load of 1 MPa of 0 to 5%, and having a creep rate per hour during a steady-state creep period of 20,000 ppm or less.

5. The heat-resistant seal material as defined in claim 4, wherein the heat-resistant seal material does not break for 15 hours when subjected to the creep test.

6. The heat-resistant seal material as defined in claim 1, comprising the vapor-grown carbon fibers in an amount of 3 to 20 parts by weight, and having a compression set when subjected to a compression set test at a compression rate of 25% and a temperature of 230° C. for 70 hours of 0 to 18% and a dynamic modulus of elasticity at 230° C. (E'/230° C.) of 29 to 70 MPa.

7. An endless seal member formed by using the heat-resistant seal material as defined in claim 1 and having an external shape without ends.

8. The endless seal member as defined in claim 7, the endless seal member being an O-ring having a circular horizontal cross-sectional shape.

9. A downhole apparatus comprising the endless seal member as defined in claim 7.

\* \* \* \* \*